United States Patent [19]
Greer

[11] 3,816,725
[45] June 11, 1974

[54] MULTIPLE LEVEL ASSOCIATIVE LOGIC CIRCUITS

[75] Inventor: David L. Greer, Manlius, N.Y.

[73] Assignee: General Electric Company, Syracuse, N.Y.

[22] Filed: Apr. 28, 1972

[21] Appl. No.: 248,572

[52] U.S. Cl............... 235/152, 307/207, 340/166 R
[51] Int. Cl. ............................................. G06f 7/38
[58] Field of Search................... 235/152, 156, 197; 307/207; 340/166 R

[56] References Cited
UNITED STATES PATENTS

| | | | |
|---|---|---|---|
| 3,345,505 | 10/1967 | Schmid............................. | 235/197 |
| 3,566,153 | 2/1971 | Spencer..................... | 340/166 R X |
| 3,579,119 | 5/1971 | Yau et al........................ | 307/207 X |
| 3,618,024 | 11/1971 | Leger et al..................... | 340/166 R |
| 3,662,345 | 5/1972 | Shinohara et al.............. | 340/166 R |

*Primary Examiner*—Felix D. Gruber
*Assistant Examiner*—James F. Gottman
*Attorney, Agent, or Firm*—Carl W. Baker; Frank L. Neuhauser; Oscar B. Waddell

[57] ABSTRACT

Disclosed are universal associative logic circuits for use in designing logic systems. The logic circuits comprise an array of logic elements interconnected in a preselected configuration to implement logic in factored and unfactored form by generating single Boolean functions and complex groups of such functions having single and multiple outputs through multiple levels of combinational logic providing electrical responses to signals applied to the circuit and to signals generated within the circuit. Sequential logic functions are generated by interconnecting the logic elements to form storage elements.

21 Claims, 8 Drawing Figures

MULTIPLE LEVEL ASSOCIATIVE LOGIC CIRCUITS

BACKGROUND OF THE INVENTION

This invention relates generally to logic circuits and more particularly to programmable universal logic circuits suitable for mass fabrication in semiconductor integrated circuit form for providing sequential and combinational logic generating output function signals on single and multiple digit lines.

1. Field of the Invention

In the field of logic circuit implementation, such as in the design of digital computers, large numbers of logic circuits are used. Many such logic circuits are implemented together on a single substrate in monolithic form and are known as integrated circuits or devices. To achieve a logic system design at a reasonable cost which performs in accordance with system specifications necessitates logic circuits having broad universal applications so that only a few different types of circuits need be designed and stocked in inventory.

2. Description of the Prior Art

Logic circuit design engineers have long sought to design universal logic circuits which would greatly reduce the requirement of having many different types of logic circuits on hand. The ideal universal logic circuit would greatly fulfill this requirement by providing in one device the capability of generating any arbitrary Boolean function in factored or unfactored form having a single or multiplicity of outputs which can operate in combinational or sequential modes.

Logic circuits emerging in the art today attempt to present a universal logic design as array logic or matrix structures using monolithic circuit techniques. In one known circuit, logic elements are layed out in an array of rows and columns with programmable interconnections. The logic elements are programmed in the factory by connecting or not connecting the input terminal of each logic element to an input signal line corresponding to each of the respective columns. The output terminal of each logic element in each of the respective rows is connected in common to an OR gate. When input signals are applied to the logic elements, each row having appropriate programmed connections associates with a predetermined pattern of the input signals generating an output function signal.

This circuit has the distinct disadvantage that it can provide only one output function signal at a time for a predetermined pattern of the input signals. Further, the circuit does not provide any memory capability. Thus, it is incapable of performing sequential logic functions.

Another known circuit utilizes two array structures similar to that just described, but not having the OR gate connected to the rows of the circuit. In this circuit, the output function signals of each of the columns of one structure are connected to corresponding columns of another structure. The output function signals of the first structure are representative of the product terms of the input signals. The other structure provides output function signals representative of the logical sums of the input product terms. This circuit also contains flip-flops apart from the two structures for storing the output function signals of the second structure and for providing these latter signals as inputs to the first structure. The flip-flops allow the circuit to perform sequential logic functions.

In this latter circuit, a maximum of two levels of logic can be used in order to derive function signals representative of sum-of-product terms. Further, only one of several function signals at a time can be generated in response to a given combination of the product term signals. Additionally, in the design of this circuit, the logic design engineer must consider the implementation of the flip-flops apart from the combinational logic since the inputs and outputs of the flip-flops connect externally of the array structures.

As can be seen, the prior art circuits are only capable of generating relatively simple single output function signals. As such, in order to generate multiple output signals, it is necessary to connect several circuits together. This leads to the use of an extensive number of devices to achieve a given logic system design.

Also, one of the major problems facing the designer of integrated circuits is the accommodation of a sufficient number of input-output pins on a device of a given size to handle all of its designated functions. Since the space is limited, any scheme is less than optimum which increases the number of pins beyond the minimum number necessitated by the input-output requirements of the function being generated. To form a given function, the prior art universal logic schemes require many additional pins to provide electrical control inputs to configure the logic within the devices. Because the number of pins on a device must be limited, such forms of universal logic can lead to the use of excessive numbers of devices. This problem becomes particularly acute as the number of gates per device increase.

Designing digital systems or equipment to take advantage of the benefits of large scale integration is only partially successful using commercially available complex logic devices. This is because such devices are only available to perform common logic functions such as add, multiply, etc., and therefore non-standard functions, such as control and other random type logic functions, must be implemented using single gate devices. Consequently, the overall average of gates per device within the equipment will remain low.

It is therefore desirable to provide a universal logic circuit which is capable of generating Boolean functions in any form and which has a minimum number of input-output pins necessary to perform the required functions.

SUMMARY OF THE INVENTION

The present invention largely overcomes these problems of the prior art by providing a programmable associative logic circuit array having universal utility which operates on the principle that any Boolean function can be expressed as the sum-of-products or the product-of-sums of a plurality of function literals, also referred to as binary variables.

In operational concept, this principle is achieved by applying input binary variable signals to the circuit and internally generating function signals whenever the binary variable signals associate or match with stored implicants or implicates which represent stored data items.

In the case of functions in the sum-of-products form, the necessary association of the binary variable signals can be achieved by using AND gates. Similarly, in the case of functions in the product-of-sums form, the association can be achieved by using OR gates.

Since the generation of any one function signal is only dependent upon the existence of a match between selected binary variable signals and stored implicants, the signals from the above-mentioned gates can be combined by means of OR gates to form a plurality of output function signals in the case of functions in sum-of-products form and combined by AND gates to form a plurality of output function signals in the case of functions in product-of-sums form.

Further, a function signal need not be limited to use as a device output but can be additionally used as an input in the manner as described for the input binary variable signals to form additional function signals. In this way, the capability of implementing functions in factored form, permitting efficient implementation of multiple output functions with a minimum of redundant logic is provided.

Based on the described principle, the present invention provides a universal logic circuit comprised of a plurality of logic elements, each having an input and an output, arranged substantially in orthogonally disposed columns and rows. The circuit is programmed by connecting the input of certain predetermined logic elements in the respective columns in common to an input connecting means associated with individual ones of the columns.

The output one or more of these and other predetermined logic elements in each of the respective rows are connected in common to corresponding first connecting means for carrying first function signals. These first function signals are representative of combinations of signals and their complements are applied to the logic elements via the input connecting means. The circuit is further programmed by connecting each of the first connecting means to the input of one or more of certain preselected ones of the logic elements in the respective rows.

Additionally, the output one or more of these latter and other preselected logic elements in each of the respective columns are connected in common to corresponding second connecting means for carrying output function signals. The output function signals are representative of combinations of signals applied to the logic elements via the first connecting means.

Finally, the output function signals may serve as the device output signals or input signals or both. In those cases where the second connecting means is used to supply input signals, it acts also as the input connecting means, thus providing internal signal feedback.

Storage elements, such as binary cells, are formed by interconnecting logic elements in selected ones of the columns and rows utilizing the aforementioned connecting means to provide signal feedback paths. The signals on these feedback paths serve to latch the storage elements in either of two binary states and can serve additionally as input signals in the formation of further function signals.

According to the present invention, the aforementioned logic circuit provides a circuit of increased utility capable of simultaneously implementing combinational logic functions in factored form permitting the generation of a plurality of output function signals and implementing sequential logic permitting the generation of a plurality of binary state signals representative of the states of binary cells and input variables.

The circuit is compatible with many types of binary digital apparatus such as calculators, peripheral input-output controllers, terminals and digital computers, where it is desirable to perform sequential timing control functions, counting, shift register operations, data storage, and time delay. The circuits used to perform these kinds of sequential functions utilize flip-flops of various types, such as J-K, T, SR, D, SRT, etc., for forming shift registers, counters, latches and other circuits, which can be constructed from the logic elements in the circuit array of the present invention.

As will be seen, the associative approach to logic implementation utilized by the invention offers the important advantage of accommodating a wide variety of Boolean functions with only minor modification of a single basic circuit array structure.

It is therefore an object of the present invention to provide universal logic circuits having enhanced logic function capabilities for use in a logic system.

Another object is to provide a logic circuit capable of performing combinational and sequential logic operations for simultaneously providing a plurality of output signals representative of single Boolean functions and groups of such functions in response to signals representative of input binary variables and internally generated function signals.

Still another object is to provide a programmable associative logic circuit having binary cells and multiple levels of combinational logic elements responsive to binary variable signals, internally generated function signals and binary state signals for generating multiple output function signals representative of any desired combinations of the binary variable signals, the function signals and the binary state signals.

Still another object is to provide a universal logic circuit array having a plurality of logic elements arranged in substantially orthogonally disposed columns and rows interconnected in a multiple level logic configuration for simultaneously generating a plurality of output function signals representative of groups of Boolean functions.

Still another object is to provide a universal logic circuit array having a plurality of logic elements arranged in substantially orthogonally disposed columns and rows interconnected through row and column conductors to form a multiple level logic configuration permitting the implementations of combinational logic functions in factored form and providing signal feedback paths for controlling sequential logic operations.

Another object is to provide a universal programmable logic circuit array in monolithic form having logic elements interconnected through row and column conductors forming multiple level logic and sequential logic capable of performing memory storage, shift register, counter, timing, sequencing and latch functions.

The foregoing and other objects will become apparent as this description proceeds and the features of novelty which characterize the invention will be pointed out in particularity in the claims annexed to and forming a part of this specification.

BRIEF DESCRIPTION OF THE DRAWING

The present invention may be more readily described and understood by reference to the accompanying drawing in which.

DESCRIPTION OF THE PREFERRED EMBODIMENT

The present invention is ideally suited for fabrication in integrated circuit form wherein a plurality of logic elements, such as diodes, bipolar transistors or metal oxide semiconductors (MOS) transistors are formed on a single crystal silicon substrate, e.g., P- or N-channel enhancement mode field effect transistors (FET). The substrate may be of other materials, however, such as germanium or gallium arsenide or silicon formed on sapphire or other substances. These logic elements may be interconnected to form AND, OR, NOR, NAND, or exclusive OR logic gates utilizing either positive or negative logic notation. The manner in which these logic gates may be utilized to perform various types of logic functions is documented in many of the well-known books pertaining to the utilization and design of logic circuits. For this reason, the basic fundamentals of constructing logic circuits utilizing these various types of semiconductors will not be described, it being understood that those having ordinary skill in the art will readily understand the various ways of implementing the logic elements to construct the circuits of the invention.

Figure 1:
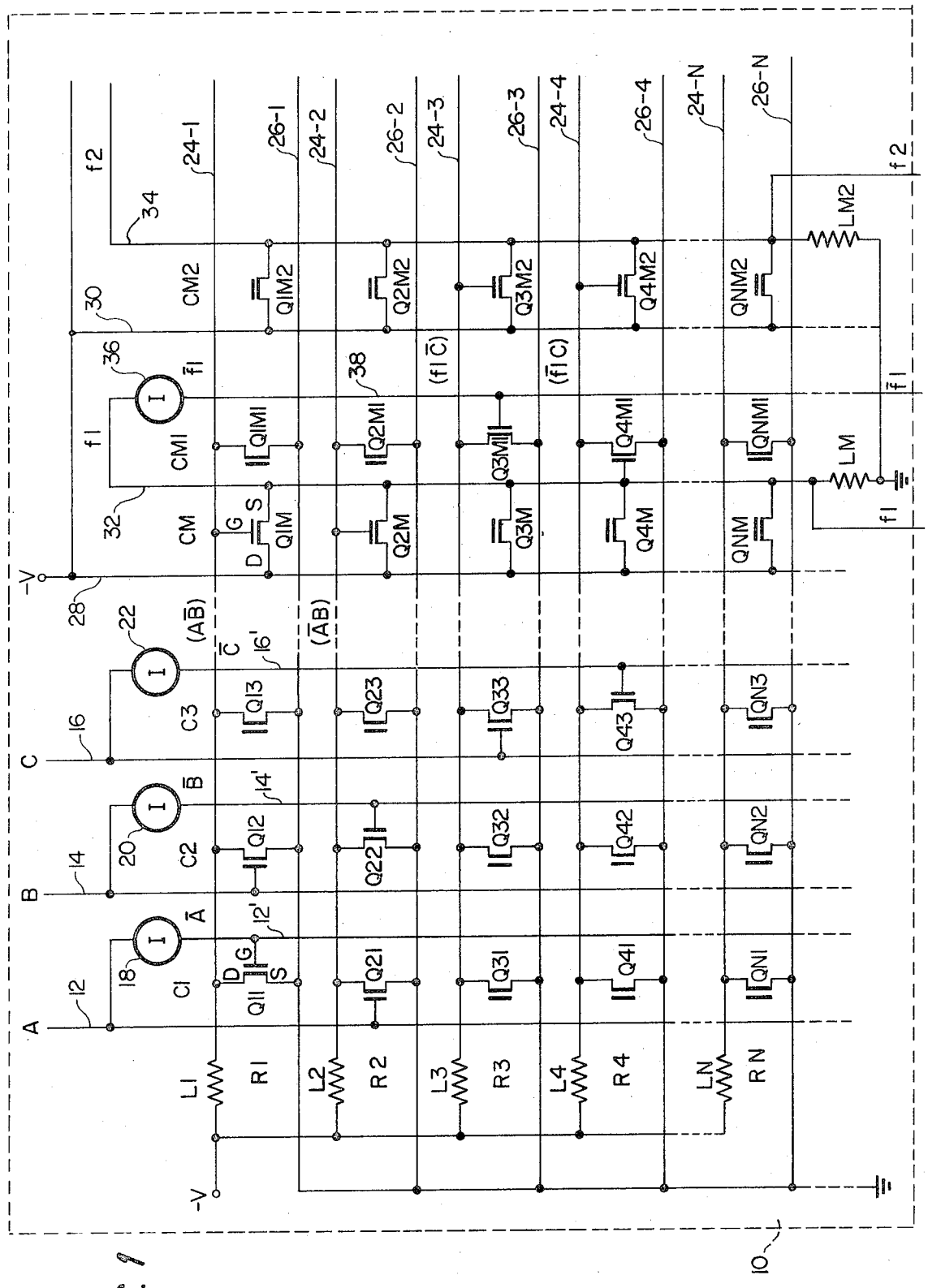
FIGS. 1 and 2 are schematic circuit diagrams in accordance with the invention utilizing transistors and diodes respectively.

Reference is now made to FIG. 1 which illustrates, as one embodiment of the invention, an array or logic circuit 10 utilizing P-channel enhancement mode field effect transistors (FET) arranged in a plurality of rows R1–RN and columns C1–CM2. The top row is comprised of transistors Q11, Q12, Q13, Q1M, Q1M1, and Q1M2, the number (1) immediately adjacent the Q designating the row number. For example, transistors Q21 through Q2M2 comprise row 2, Q41 through Q4M2 comprise row 4, etc. In a similar fashion, the second number to the right of the Q designates a particular column of transistors. That is, transistors Q11, Q21, Q31, Q41, and QN1 comprise the left-hand column or column C1, transistors Q12 through QN2 comprise column C2, Q13–QN3, column C3, etc.

Each of the transistors includes a gate (G) or input electrode, a source (S) electrode and a drain (D) or output electrode as indicated on the drawing at transistors Q11 and Q1M.

In fabricating the circuit, predetermined ones of transistor gate electrodes are either connected or not connected to an input conductor. It will be noted that one of a plurality of binary variable signals A, B, and C is applied to predetermined ones of the transistors in each of the columns C1, C2, and C3 via a corresponding one of a plurality of input conductors 12, 14, and 16 respectively. In column C1, binary variable signal A is applied to the gate electrode of Q21 via conductor 12. Signal A is also applied to a logical inverter 18 which provides a signal $\overline{A}$, to the gate electrode of Q11 via a conductor 12'.

As shown in column C2, a binary variable signal B is applied, via the input conductor 14, to the gate electrode of Q12 and the complement of signal B, signal $\overline{B}$, is applied to the gate electrode of transistor Q22 via a logical inverter 20 on a conductor 14'.

In column C3 a binary variable signal C is applied to the gate electrode of Q33 via an input conductor 16. A signal $\overline{C}$ is applied to the gate electrode of Q43 via a logical inverter 22 and a conductor 16'.

Each of the rows of transistors R1–RN includes a first common conductor or connecting means (24–1 through 24–N) connecting the drain electrode of predetermined ones of the transistors, such as Q11, Q12, Q13 and Q1M1 of row R1, in common. Conductors (24–1 through 24–N) also connect to a gate input of certain preselected ones of the transistors in each of the respective rows, such as Q1M, Q2M in column CM and Q3M2 and Q4M2 in column CM2. The common conductors (24–1 through 24–N) are each connected to a first potential source designated −V, through a corresponding one of a plurality of load resistances or elements L1–LN. For example, in row R1 of FIG. 1, the drain electrodes of transistors Q11, Q12, Q13 and Q1M1 are connected in common through load resistance L1 to the −V potential source. Also, the common conductor 24–1 provides an input to the gate electrode (G) of transistor Q1M. It will be noted that the drain electrodes of the transistors in all of the other rows R2–RN are connected in an analogous configuration.

In addition, predetermined ones of the transistors in each of the rows R1–RN have their source electrodes connected together via a one of a plurality of first power conductors (26–1 through 26–N). The power conductors (26–1 through 26–N) are all terminated at a second potential source designated by a ground symbol in FIG. 1.

Reference is now made to the columns CM and CM2 comprising transistors Q1M–QNM and Q1M2–QNM2 respectively. It will be noted that the drain electrodes of the transistors in each of these columns are connected together by a corresponding one of a plurality of second power conductors 28 and 30 to the −V potential source. Also, the source electrode of each of the transistors in columns CM and CM2 are connected together, via a corresponding one of a plurality of second connecting means or common conductors 32 and 34, to the second potential source (ground) via a corresponding one of a plurality of resistance elements LM and LM2.

Common conductor 32 serves as an output signal source for a function signal designated $f1$ and also provides an internal connection for signal $f1$ to a logic inverter 36. Inverter 36 provides the complement of signal $f1$, $\overline{f1}$, to the gate electrode of a transistor Q3M1.

With reference to column CM2, it will be noted that conductor 34 constitutes an output connection for a function signal $f2$ and also provides signal $f2$ internally for further utilization in the circuit for generating additional function signals.

The circuit of FIG. 1 is capable of generating a plurality of output function signals $f1$, $\overline{f1}$ and $f2$ in response to combinations of the input binary variable signals A, B and C. The circuit of FIG. 1, utilizes P-channel enhancement mode transistors. As such, in order to get any transistor in the circuit to achieve a conductive state, the input signal applied to the gate electrode of the transistor must be of a negative potential sufficient to overcome the threshold voltage of the transistor. In negative logic notation, a negative signal is a true statement or a binary 1 and a more positive signal is a not true statement or a binary 0.

The operation of the circuit of FIG. 1 will now be explained. Referring to row R1 and specifically to conductor 24-1, there is shown a product term or implicant, signal (A $\overline{B}$), which is representative of the states of the binary variable signals A and B applied to the circuit on conductors 12 and 14, respectively. Transistors Q11 and Q12 in conjunction with element L1 comprise an AND gate with inputs A and B capable of producing either a binary 1 or a binary 0 signal on line 24-1.

The product term signal (A $\overline{B}$) will be generated as a binary 1 on conductors 24-1 only when the binary variable signals A and B are binary 1 and binary 0 respectively. Any other combinations of the input signals A and B will generate a binary 0 on conductor 24-1.

Signal (A $\overline{B}$) is generated as a binary 1 in the following manner: The signal A is applied as a binary 1 to inverter 18 generating a binary 0 signal $\overline{A}$. Signal $\overline{A}$ is applied to the gate electrode of Q11, thus preventing it from conducting. Binary variable signal B is applied as a binary 0 to the gate electrode of Q12 also preventing it from conducting. Since transistors Q11 and Q12 are both non-conducting, product term signal (A $\overline{B}$) is generated as a binary 1.

Referring now to row R2, it will also be noted that transistors Q21 and Q22 in conjunction with element L2 also comprise an AND gate analogous to that just described for transistors Q11 and Q12.

Referring to rows R3-RN it is seen that it is possible to form additional AND gates analogous to those described for rows R1 and R2. Also, it is readily foreseeable that any manner of binary variable input signals, such as A and B, can be used at input signals to the AND gates formed on rows R1-RN.

Referring now to column CM and specifically to conductor 32, there is shown a signal $f1$ which is generated in response to the product term signals (A $\overline{B}$) and ($\overline{A}$ B) on conductors 24-1 and 24-2 respectively.

Transistors Q1M and Q2M in conjunction with element LM comprise an OR gate capable of producing signal $f1$ as a binary 1 when either or both of the signals (A $\overline{B}$) or ($\overline{A}$ B) is a binary 1 as follows:

The binary 1 signal (A $\overline{B}$) is applied to the gate electrode of transistor Q1M driving it into conduction and generating the function signal $f1$ in a first instance.

Signal $f1$ is generated as a binary 1 in a second instance when the product term signal ($\overline{A}$ B) is applied to the gate electrode of transistor Q2M driving it into conduction.

Function signal $f1$ is provided on conductor 32 as an output of the circuit and also as an input to logic inverter 36 and Q4M1 for the development of additional function signals and product term signals to be described.

Still referring to column CM it should be recognized that any number of the other transistors in the column could have been connected to their corresponding row conductors to extend the number of product term signals contributing to the generation of signal $f1$.

Reference is now made to column CM1 where the inverter 36 generates an output signal $\overline{f1}$ representative of the complement of signal $f1$.

The structure of the logic elements of column CM1 is like that of the structures of columns C1–C3. However, it is significant to note that the signals $f1$ and $\overline{f1}$ applied to transistors Q4M1 and Q3M1 respectively are generated internally rather than externally applied as are signals A and B.

Like the AND gate transistors Q11, Q12 and Q21, Q22 described for columns C1 and C2 in rows R1 and R2, each of the transistors in column CM1 constitutes a potential AND gate logic element.

The formation of an AND gate involving transistor Q3M1 of column CM1 may be best described by referring to conductor 24-3 of row R3. In addition to Q3M1, a transistor Q33 comprises part of the AND gate and receives as an input the binary variable signal C on conductor 16. An additional product term signal ($f1$ $\overline{C}$) is generated as a binary 1 on conductor 24-3 only when the signals $f1$ and C are binary 1 and 0 respectively. Any other combination of signals $f1$ and C will generate a binary 0 signal on conductor 24-3.

Referring to conductor 24-4 of row R4 it can be seen that transistors Q43 and Q4M1 also comprise an AND gate. However, Q43 and Q4M1 generate a product term ($\overline{f1}$ C) as a binary 1 on conductor 24-4 only when signal $f1$ on conductor 32 and C on conductor 16 are binary 0 and 1 respectively.

The additional product term signals ($f1$ $\overline{C}$) and ($\overline{f1}$ C) are used to generate other function signals such as a function signal $f2$ on conductor 34 of comumn CM2.

In column CM2 transistors Q3M2 and Q4M2 in conjunction with element LM2 constitute an OR gate like that described in connection with transistors Q3M1 and Q4M1 of column CM1. Signal $f2$ will be generated as a binary 1 when either one or both of the signals ($f1$ $\overline{C}$) and ($\overline{f1}$ C) is applied as a binary 1 to Q3M2 and Q4M2 respectively.

Like column CM1 any number of the transistors in column CM2 could have been connected to their corresponding row conductors to extend the number of input signals contributing to the generation of signal $f2$.

From the previous description, it can be seen that any number of output function signals can be generated in a manner analogous to the generation of function signals $f1$, $\overline{f1}$ and $f2$ by an extension of the logic circuit array of FIG. 1.

In summary of the description of FIG. 1, the Boolean equations representing the function signals $f1$ and $f2$ are:

$$f1 = A\overline{B} + \overline{A}B$$
$$f2 = f1\,\overline{C} + \overline{f1}\,C$$

Figure 2:
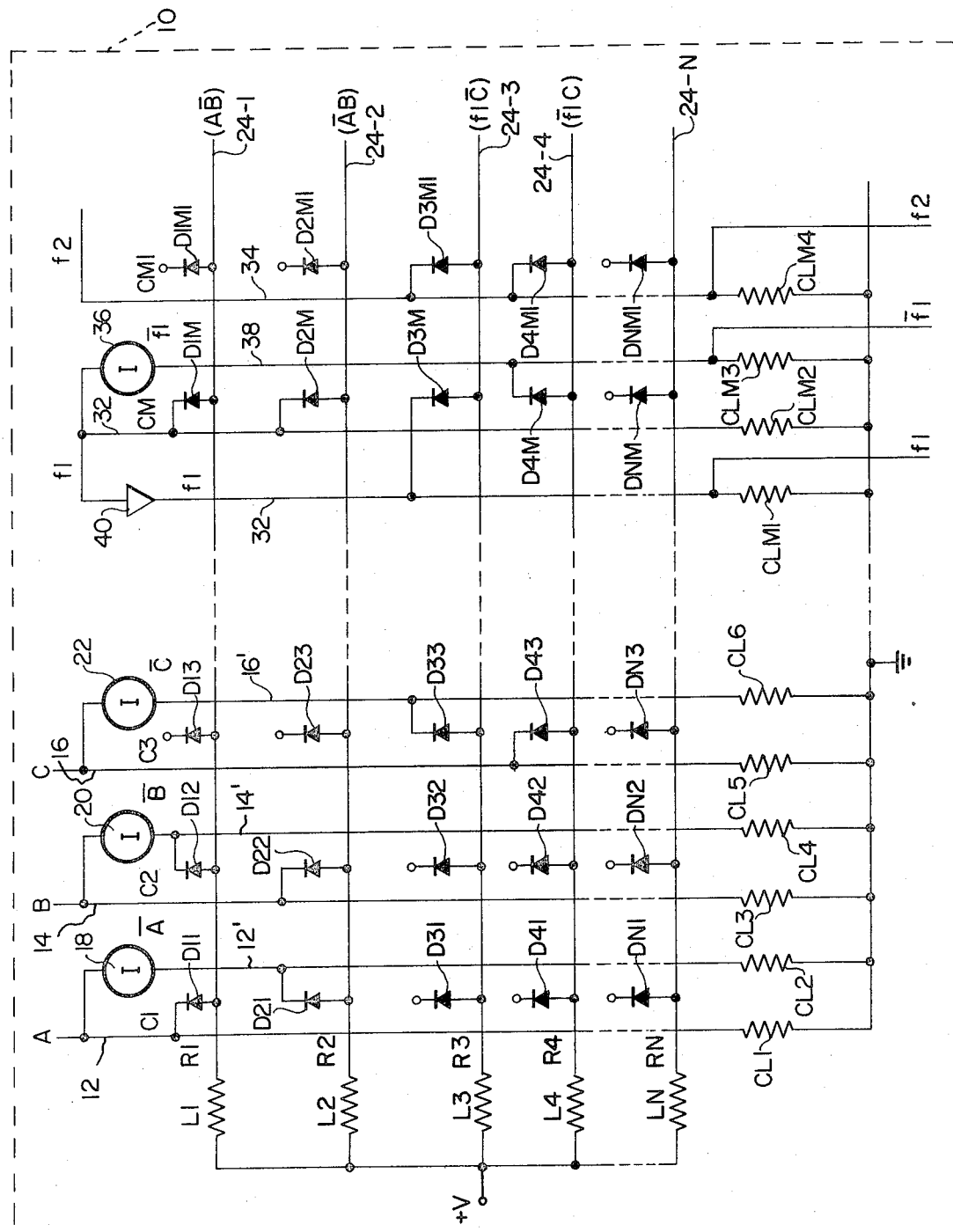
Figure 4:
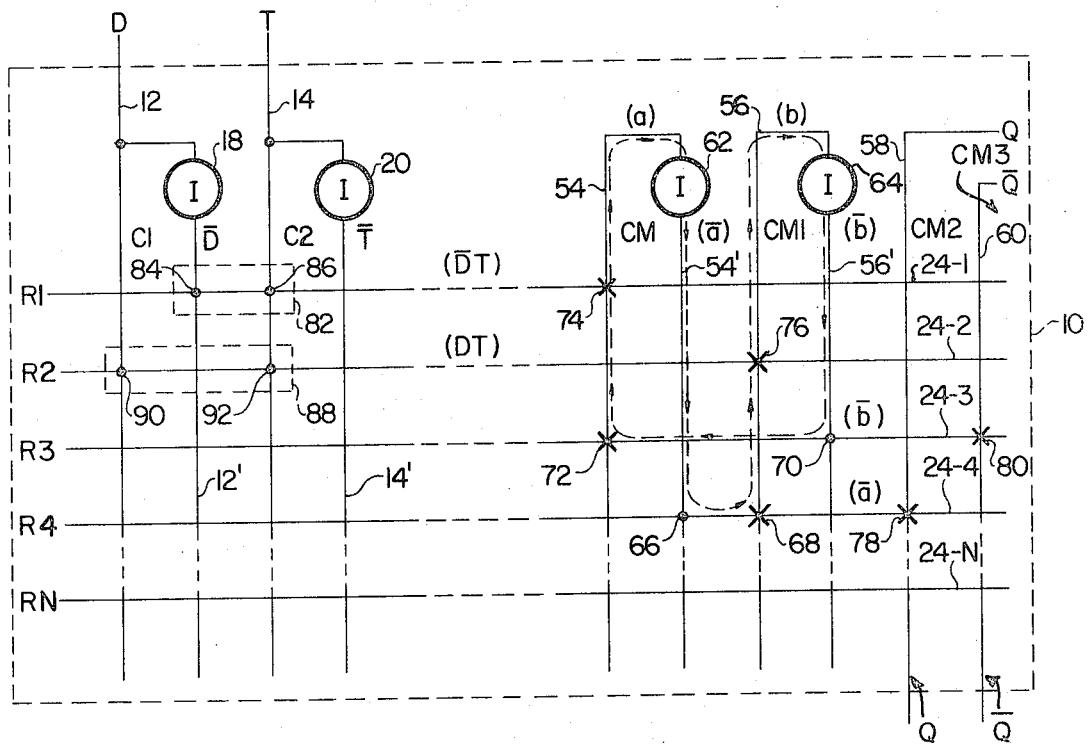
FIG. 4 is a logic schematic diagram illustrating the construction of a storage element and associated logic elements in accordance with the invention.

FIG. 2 illustrates another embodiment of the invention for generating the output function signals $f1$, $\overline{f1}$, and $f2$ wherein like numbers to those used in FIG. 4 are incorporated as applicable. In addition, FIG. 2 utilizes basically the same numbering scheme as that of FIG. 1. That is, where the first digit following a D represents the row number and the second digit following the D represents the column number. For example, row R1 is comprised of a plurality of diodes D11, D12, D13, D1M and D1M1 and column C1 is comprised of diodes D11, D21, D31, D41 and DN1.

In a manner similar to FIG. 1, the cathodes of predetermined diodes are either connected or not connected to input signal conductors when the circuit is fabricated.

Also, in a fashion similar to that described for FIG. 1, the output electrode or anode of each of the predetermined diodes in each of the rows is connected to one of a plurality of common conductors (24–1 through 24–N) through corresponding resistances L1–LN back to a first source potential +V. The common conductors 24–1, 24–2, 24–3, and 24–4 also provide product term signals (A $\overline{B}$), ($\overline{A}$ B), ($f1$ $\overline{C}$), and ($\overline{f1}$ C) to the anodes of diodes D1M, D2M, D3M1 and D4M1 respectively. In FIG. 2, however, it will be noted that each of the conductors 12, 12', 14, 14', 16, 16', 32, 32', 34 and 38 is connected to the second potential source (ground) through corresponding column load resistances CL1–CLM4.

In describing the operation of the circuit 10 of FIG. 2, positive logic notations will be used; i.e., a positive signal is a binary 1 and a substantially zero or negative signal is a binary 0.

The generation of function $f1$ is described as follows: The product term signal (A $\overline{B}$) is generated on conductor 24–1 when the binary variable signal A is applied to the cathode of diode D11 as a binary 1 and the complement of signal B, signal $\overline{B}$, is applied to the cathode of diode D12 as a binary 1 via logic inverter 20 and conductor 14'. Diodes D11 and D12 are thus both reverse biased allowing the common conductor 24–1 to rise to the +V potential generating the binary 1 product term signal (A $\overline{B}$).

Product term signal (A $\overline{B}$) is applied to the anode of diode D1M, causing the diode to be forward biased clamping conductor 32 to the +V potential less the voltage drop across resistor L1. Forward biasing of D1M generates the binary 1 function signal $f1$, which is applied to the cathode of a diode D3M via a noninverting amplifier 40 and conductor 32'. The function signal $f1$ from amplifier 40 is also provided as an output from the circuit 10 as shown at the bottom of FIG. 2.

Reference is now made to row R2 wherein signal f1 may also be generated by the combination of the binary variable signals $\overline{A}$ and B to generate the product term signal ($\overline{A}$ B) on conductor 24–2. Product term signal ($\overline{A}$ B) is generated when the binary variable signal A is applied to logic inverter 18 as a binary 0, inverted to a binary 1 and applied to the cathode of diode D21 via conductor 12' and when the binary variable signal B is a binary 1 and applied to the cathode of D22 on conductor 14. Diodes D21 and D22 are thus reverse biased, causing conductor 24–2 to rise to the +V potential, generating the binary 1 signal ($\overline{A}$ B). Signal ($\overline{A}$ B) is applied to the anode of diode D2M causing it to be forward biased generating function signal $f1$ in the same manner as described in relation to diode D1M.

To generate the function signal $\overline{f1}$ from inverter 36, it is required that both signals A and B each be a binary 1 or that signals A and B each be a binary 0 simultaneously. When these combinations of the binary variable signals A and B occur, the conductors 24–1 and 24–2 will be at ground potential (binary 0), and diodes D1M and D2M will not be forward biased. Thus, the signal on conductor 32 will also be a binary 0 generating binary 1 function signal $\overline{f1}$ at the output of logic inverter 36.

The generation of the function signal $f2$ is generated in two instances both of which will be described.

The function signal $f2$ is generated in first and second instances respectively when either the $f1$ $\overline{C}$ or $\overline{f1}$ C signal is a binary 1. Each of these instances will be described. In the first instance, to generate signal f1 $\overline{C}$ requires that function signal $f1$ be a binary 1 and that input signal C be a binary 0 such that the output signal $\overline{C}$ from inverter 22 on conductor 16' is a binary 1.

Under these conditions, diodes D33 and D3M will both be reverse biased and the product term signal ($f1$ $\overline{C}$) on conductor 24–3 will be a binary 1. Signal ($f1$ $\overline{C}$) is applied to the anode of diode D3M1, thus causing it to be forward biased generating the binary 1 function signal $f2$ on conductor 34.

Now referring to row R4 of FIG. 2, in the second instance the generation of function signal ($\overline{f1}$ C) requires that function signal $\overline{f1}$, applied to the cathode of diode D4M via conductor 38, and input signal C applied to the cathode of diode D43 via conductor 16, both be binary 1's. Diodes D4M and D43, therefore, are reverse biased. As a result, the product term signal ($\overline{f1}$ C) on conductor 24–4 is a binary 1 causing diode D4M1 to be forward biased generating function $f2$.

It is significant to note that function signal $f2$, as well as providing an output on conductor 34 can also be utilized within the logic circuit 10 to generate further complex functions by combining with other binary variable signals or internally generated functions. This is illustrated at the top right corner of FIG. 2 wherein conductor 34 is left unterminated, indicating that signal $f2$ can be extended in the logic circuit array as an input to generate the further complex functions.

It is quite apparent from the description of FIGS. 1 and 2 that any internally generated functions can be logically extended in the circuit array to form or generate any Boolean function desired.

Further, as can be seen from the previous discussions in connection with FIGS. 1 and 2, each of the embodiments perform precisely the same logic functions utilizing either field effect transistors and negative logic notation or diode logic utilizing positive logic notation. It is to be understood that FIGS. 1 and 2 are distinct but yet exemplary, since to those having ordinary skill in the art, it is quite apparent that a logic circuit of the type of the present invention may be constructed utilizing any type of logic element.

Figure 3:
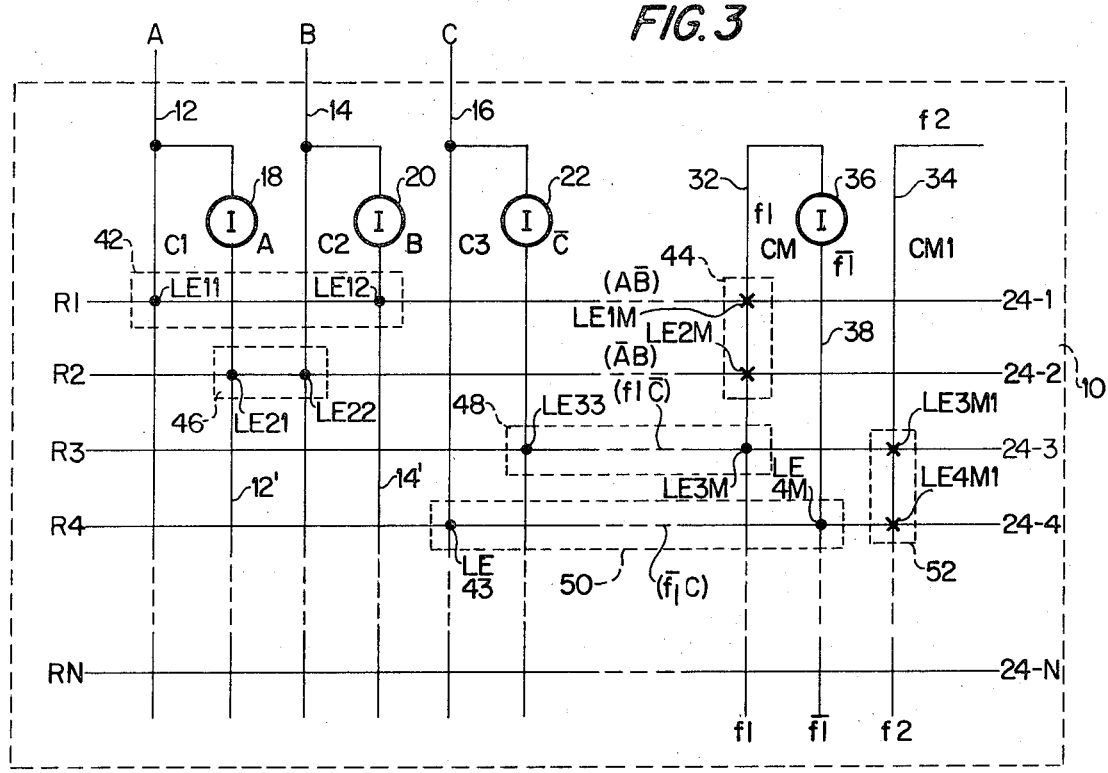
FIG. 3 is a logic schematic diagram of FIGS. 1 and 2 using associative logic symbology and is useful in understanding the structure and operation of the invention as illustrated in FIGS. 4, 5 and 8.

Reference is now made to FIG. 3 which illustrates a logic circuit constructed in accordance with the invention utilizing associative logic symbology for purposes of describing the subsequent portions of the invention. FIG. 3 also uses like numbers, where applicable, to those numbers of FIGS. 1 and 2.

It will be noted that the circuit of FIG. 3 is layed out in a plurality of rows R1–RN and columns C1–CM1 of conductor lines depicting an array having intersections defined by dots and X's at selected ones of the intersections. Each of the dots and X's represent the physical connection of the input and the output of a logic element located at that intersection. Also, certain ones of the dots and X's are enclosed in dashed lines. The combined dots within a corresponding dashed block represent an AND gate and the X's similarly enclosed represent an OR gate. The binary variable signals, such as A, B and C, are provided on conductors 12, 14 and 16 respectively as inputs to the columns of logic elements. The column conductors, such as 32 and 34, traversing through the X's, carry output signals from the OR gates and input signals to the logic elements of the AND gates. The horizontal or row conductors 24-1 through 24-N carry output signals from the AND gates and serve as inputs to the logic elements of the OR gates.

The operation of FIG. 3 is identical to that as previously described in connection with FIG. 2. For example, the product term signal (A $\bar{B}$) on conductor 24-1 of row R1 is generated as a binary 1, when the binary variable signals A and $\bar{B}$ are applied as binary 1's to logic elements LE11 and LE12 of an AND gate 42. Product term signal (A $\bar{B}$) is applied to a logic element LE1M of an OR gate 44 generating the function signal $f1$ on conductor 32 in a first instance. The binary variable signals $\bar{A}$ and B are applied as binary 1's to logic elements LE21 and LE22 respectively of an AND gate 46 to generate the product term signal ($\bar{A}$ B). Product term signal ($\bar{A}$ B) is applied as a binary 1 to a logic element LE2M via conductor 24-2, generating function signal $f1$ on conductor 32 in the second instance.

Function signal $f2$ is generated on conductor 34 by the application of either of the product term signals ($f1$ $\bar{C}$) or ($\bar{f1}$ C) to logic elements LE3M1 and LE4M1 respectively of an OR gate 52. Product term signal ($f1$ $\bar{C}$) is generated as a binary 1 on conductor 24-3 of row R3 when $\bar{C}$ and $f1$ are applied as binary 1's to logic elements LE33 and LE3M of an AND gate 48. In a similar fashion, product term signal ($\bar{f1}$ C) is generated as a binary 1 on conductor 24-4 of row R4 when the binary variable signal C is applied to a logic element LE43 and function signal $\bar{f1}$ is applied to a logic element LE4M of an AND gate 50 and both $\bar{f1}$ and C are binary 1's.

The AND, OR operations for generating the product term and function signals as described in connection with FIGS. 1, 2 and 3 may be cascaded in any desired configuration to provide any suitable logic function or functions desired. It has been demonstrated through example how single functions, such as $f1$ and $\bar{f1}$, may be combined with binary variables, such as C and $\bar{C}$ to generate complex functions such as $f2$. From this example, it can be seen how function $f2$ could be utilized in the logic circuit array of the present invention to generate even more complex functions by combining $f2$ with other binary variable inputs or with further internally generated functions.

As previously mentioned, the invention provides the additional capability of providing a universal logic system wherein storage or memory cells may be formed by feedback paths effected by interconnecting or cross coupling the logic elements of the array. FIG. 4, using associative logic symbology, illustrates this capability by showing a relatively simple logic circuit array 10 having signal input gating logic and a D flip-flop utilizing feedback paths via logic elements and column and row conductors to form the flip-flop.

The circuit 10 of FIG. 4, like FIGS. 1 through 3, is comprised of a plurality of logic elements interconnected in an array of rows R1-RN by conductors 24-1 through 24-N, and columns C1-CM3 by conductors 12, 12', 14, 14', 54, 54', 56, 56', 58 and 60.

The storage element of FIG. 4 is comprised generally of a plurality of logic elements interconnected to form first and second feedback paths for controlling the operation of the storage element.

These feedback paths are illustrated by dashed lines in FIG. 4. A first of the feedback paths is provided from an output of a logic inverter 62 to the input of a gating element 66 via a conductor 54'. The first feedback path is continued through logic element 66, via conductor 24-4 to the input of another gating element 68, which has its output connected to the input of a logic inverter 64 by conductor 56.

The second feedback path is from the output of logic inverter 64 to the input of a gating element 70 via conductor 56'. Continuation of the second feedback path is from the output of logic element 70 to the input of a gating element 72 over conductor 24-3. The output of logic element 72 continues the feedback path from its output to the input of logic inverter 62 via conductor 54.

Two additional logic elements 74 and 76 are also included in the storage element circuit as gating elements for providing two product term signals ($\bar{D}$ T) and (D T) as control signal inputs to the storage element. These latter signals are provided on conductors 24-1 and 24-2 of rows R1 and R2 respectively.

Two binary state output signals Q and $\bar{Q}$, representative of the states of the storage element, are provided on conductors 58 and 60 from the outputs of each of two logic elements 78 and 80 respectively. Logic element 78 receives a binary variable signal $\bar{a}$ from the output of logic element 66 via conductor 24-4. Likewise, logic element 80 receives a binary variable signal $\bar{b}$ from the output of logic element 70 over conductor 24-3.

It will be noted that the binary variable signals Q and $\bar{Q}$ are shown going off the top right corner of FIG. 4, indicating that Q and $\bar{Q}$ may be combined with other signals in the circuit 10 to generate function signals, serve as inputs to other storage elements to form counters, and shift registers or to perform many other logic operations having applications in digital logic systems.

Reference is now made to AND gates 82 and 88. Product term signal ($\bar{D}$ T) is derived from the output of AND gate 82 which is comprised of logic elements 84 and 86. The binary variable signal $\bar{D}$ is provided to the input of logic element 84 on conductor 12' via logic inverter 18. Inverter 18 receives the binary variable signal D on conductor 12. Logic element 86 receives the binary variable signal T at its input on conductor 14. Product term signal (D T) is derived similarly to ($\bar{D}$ T) from an AND gate 88, which is comprised of logic elements 90 and 92. Logic element 90 receives the binary variable signal D via conductor 12, and element 92 receives the binary variable signal T over conductor 14.

The operation of the circuit of FIG. 4 will now be explained by developing each of the product term signals ($\bar{D}$ T) and (D T) and applying these signals to the storage element to control the states of the latter.

Assume that the binary variable signals $\bar{D}$ and T are simultaneously applied as binary 1's to the logic elements 84 and 86 of AND gate 82. As a result, the product term signal ($\bar{D}$ T) is generated as a binary 1 and signal (D T) on conductor 24-2 is a binary 0. Signal ($\bar{D}$ T) causes conduction of logic element 74 to generate a binary 1 signal (a), which is applied to logic inverter 62. Inverter 62 inverts signal (a), causing a signal ($\bar{a}$) to be provided as a binary 0 over the first feedback path via conductors 54', logic element 66, and conductor 24-4 to the input of logic element 68. The outputs of logic elements 68 and 76 cause a signal (b) to be applied as a binary 0 to the input of logical inverter 64 over conductor 56.

Logic inverter 64 generates a binary 1 signal ($\bar{b}$) which is provided over the second feedback path via conductor 56', logic element 70, and conductor 24-3 to the input of logic element 72. The output of logic element 72 generates the binary 1 signal (a) which is applied to inverter 62. With the signals (a), ($\bar{a}$), (b) and ($\bar{b}$) in the storage element 1 and 0 states just described, the binary is now latched in a first state through the feedback paths.

With the storage element in the first state, the binary state output signal $\bar{Q}$ is a binary 1, and Q is a binary 0. These conditions are due to the binary 1 state of signal $b$ applied to the input of logic element 80 and the binary 0 state of signal ($\bar{a}$) applied to the input of logic element 78.

To change the state of the storage element from the first state to a second state, assume that the binary variable signals D and T are simultaneously applied as binary 1's to logic elements 90 and 92 respectively of AND gate 88. As a result, the output signal ($\overline{D\,T}$) from AND gate 82 is a binary 0. AND gate 88 is enabled generating the binary 1 product term signal (D T) on conductor 24-2. Product term signal (D T) is applied to the input of logic element 76, which generates a binary 1 signal (b) on conductor 56. Signal (b) is inverted by logic inverter 64 generating the binary 0 state of signal ($\bar{b}$) which is applied to logic element 70 via conductor 56'. The output of logic element 70 is applied over conductor 24-3 to logic element 72, the latter applying the binary 0 state of signal (a) to inverter 62 via conductor 54. Logic inverter 62 thus generates a binary 1 signal ($\bar{a}$) over the first feedback path to the input of logic element 66 on conductor 54'. The output of element 66 is provided to logic element 68, which generates the binary 1 signal (b). Signal (b) is thus applied to the input of logic inverter 64 over conductor 56 to latch the storage element in the second state.

It will now be noted that the output states of the binary state signals Q and $\bar{Q}$ have changed to be representative of the second state. This is derived from the application of the binary 1 signal ($\bar{a}$) to the input of logic element 78 and the application of the binary 0 state of signal ($\bar{b}$) to logic element 80.

From the previous description of FIG. 4, several features of the universal logic circuit should be noted. A first is the AND and OR gate capabilities provided as previously described in connection with FIGS. 1 through 3. Another is the use of feedback paths for controlling the sequential operation of the storage element. And another is that the feedback paths are obtained by internal connections within the matrix array structure. Further, it should be noted that it is possible to interconnect storage elements of the type just described in connection with FIG. 4 to perform shift register or counter stages. This can be readily implemented by the interconnection of the binary state signals Q and $\bar{Q}$ to the inputs of additional storage elements constructed in the array in a similar fashion to that illustrated in FIG. 4 and providing the binary variable signal T as an input or clock timing signal to each of the storage elements.

Figure 5:
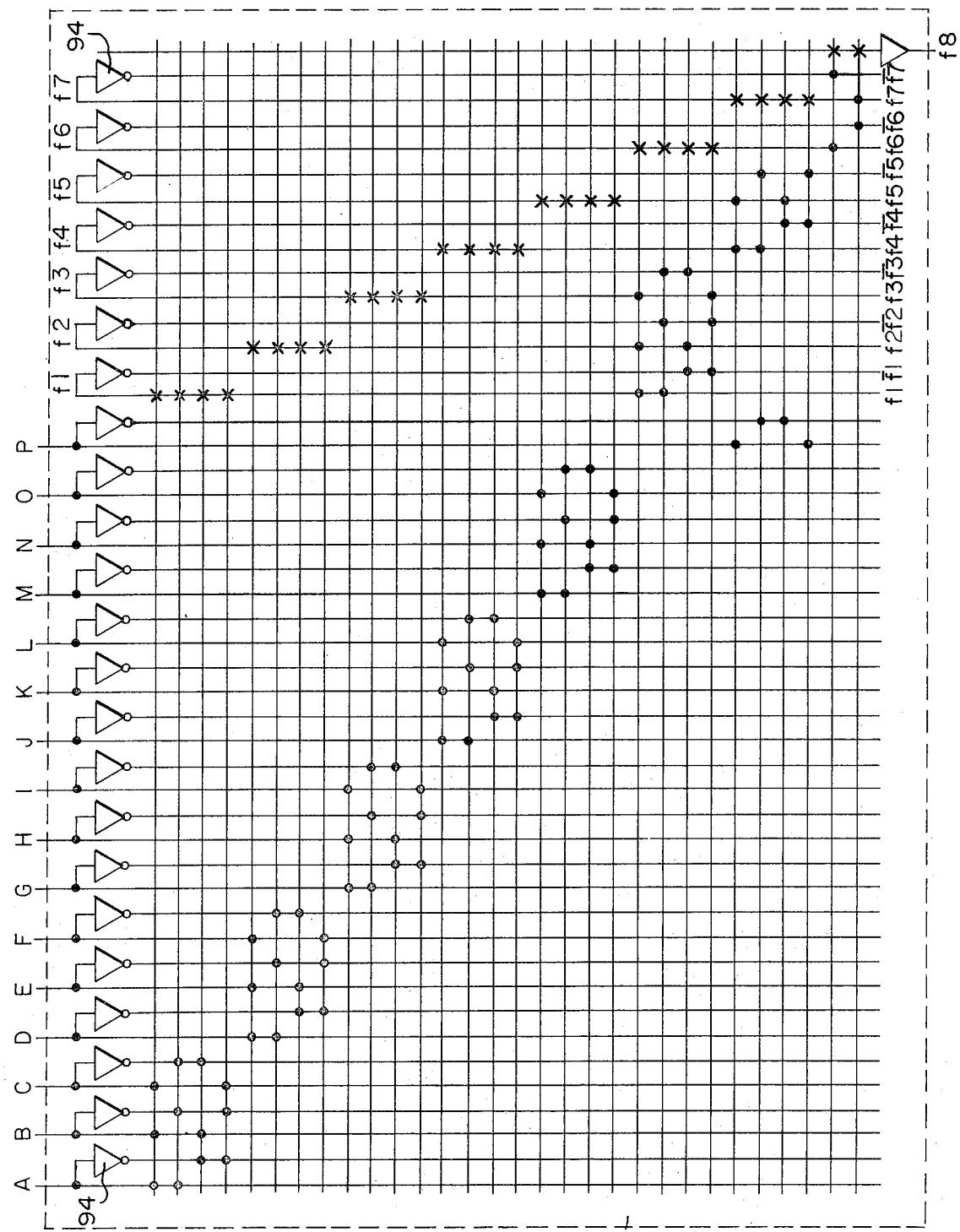
FIG. 5 is a logic schematic diagram of a complex logic circuit array in accordance with the invention for generating a plurality of output function signals.

Reference is now mede to FIG. 5 which illustrates a more complex logic circuit array 10 in accordance with the present invention in the form of a 16-bit parity encoder. The encoder of FIG. 5 is capable of simultaneously generating a plurality of output functions designated as $f1$ through $f8$.

As previously described in connection with FIGS. 3 and 4, the groups of dots on each of the row conductors represent an AND gate and the groups of X's on each of the column conductors represent an OR gate. The AND gates receive externally applied binary variable signals A–P and $\overline{A}$–$\overline{P}$ and preselected ones of function signals $f1$–$f7$ and $\overline{f1}$–$\overline{f7}$. The OR gates receive product term signals from the AND gates and provide internally generated function signals for external use and for use within the circuit for generating complex function signals. It will be noted that a plurality of logical inverters 94 are utilized to generate the binary variables $\overline{A}$–$\overline{P}$ and $\overline{f1}$–$\overline{f7}$.

Figure 6:
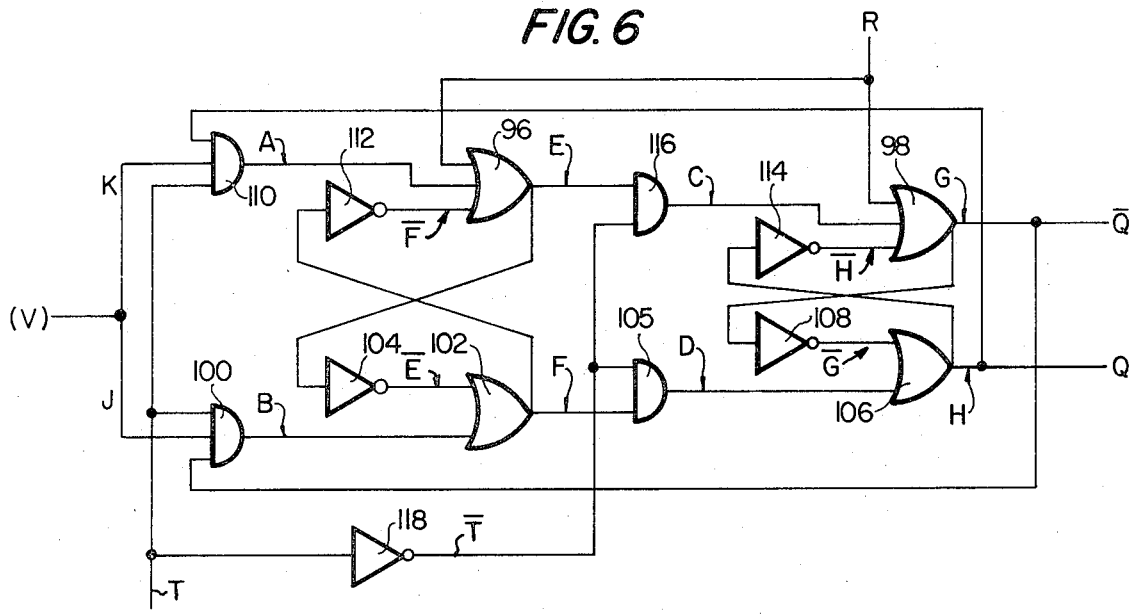
FIGS. 6 and 7 are logic schematic diagrams using well recognized logic symbols of a J-K flip-flop and a binary counter respectively, and are useful in understanding the structure and the operation of FIG. 8.

In the circuit of FIG. 5, the function signals are generated in a fashion like that previously described in connection with FIGS. 1 through 3. For this reason, it is considered unnecessary to provide a detailed description of FIG. 5. However, as an aid to the understanding of the operation of the circuit of FIG. 5, the following equations are given:

$f1 = AB\bar{C} + A\bar{B}C + \bar{A}BC + \bar{A}\bar{B}\bar{C} = A \oplus B \oplus C$
$f2 = DE\bar{F} + D\bar{E}F + \bar{D}EF + \bar{D}\bar{E}\bar{F} = D \oplus E \oplus F$
$f3 = GH\bar{I} + G\bar{H}I + \bar{G}HI + \bar{G}\bar{H}\bar{I} = G \oplus H \oplus I$
$f4 = JK\bar{L} + J\bar{K}L + \bar{J}KL + \bar{J}\bar{K}\bar{L} = J \oplus K \oplus L$
$f5 = MN\bar{O} + M\bar{N}O + \bar{M}NO + \bar{M}\bar{N}\bar{O} = M \oplus N \oplus O$
$f6 = f_1 f_2 \bar{f_3} + f_1 \bar{f_2} f_3 + \bar{f_1} f_2 f_3 + \bar{f_1}\bar{f_2}\bar{f_3} = f_1 \oplus f_2 \oplus f_3$
$f7 = P f_4 \bar{f_5} + P \bar{f_4} f_5 + \bar{P} f_4 f_5 + \bar{P}\bar{f_4}\bar{f_5} = P \oplus f_4 \oplus f_5$
$f8 = f_6 \bar{f_7} + \bar{f_6} f_7 = f_6 \oplus f_7$ As previously described and particularly in connection with FIG. 4, the invention provides the capability of forming shift registers, binary counters, etc. This capability is exemplified in FIG. 8 which illustrates a complex structure of a synchronous parallel carry counter wherein logic elements within the circuit array are interconnected to form J-K flip-flop counter stages. In view of the complexity of the drawing of FIG. 8, however, it is considered advantageous to first describe the basic structure and operation of a J-K flip-flop counter stage utilizing standard logic symbols as illustrated in FIG. 6. The operation of the J-K flip-flop stage of FIG. 6 is summarized in the following truth table:

J-K FLIP-FLOP TRUTH TABLE

| If J and K are: | | The Next Trigger Pulse Will: | | |
|---|---|---|---|---|
| J | K | | Q | $\bar{Q}$ |
| 0 | 0 | Have No Effect | | No Change |
| 1 | 0 | Set | 1 | 0 |
| 0 | 1 | Reset | 0 | 1 |
| 1 | 1 | Toggle or Count | | Change State |

Referencing FIG. 6, there is shown a trigger or clock signal designated T applied to the circuit which is repetitive positive and negative going signal. It is significant to note that in the operation of a J-K flip-flop that data is placed into the flip-flop when T goes positive and the output state of the flip-flop changes when T goes negative. As such, the Q and $\overline{Q}$ columns as shown in the truth table indicate the output states of the flip-flop after T has gone negative. Reference is now made to an input potential designated (V) which is applied to J and K inputs of the flip-flop. When the J and K inputs are tied together to a common potential, the flip-flop will toggle or operate as a counter. This is indicated in the last row of the truth table where the J and K inputs are both binary 1's. It is readily apparent that the J and K inputs could be tied to separate input potential sources for controlling the operation of the flip-flop. This is illustrated in the second and third rows of the truth table where the J and K inputs are binary 1,0 and 0,1 respectively. In the subsequent discussion, it will be assumed that the J and K inputs are tied together as shown in FIG. 6.

Positive logic notation will be used in all ensuing descriptions of the invention.

In describing the operation of FIG. 6, it is well to begin by assuming that the flip-flop is in a reset state. The reset state is established by the application of a binary 1 reset signal R to two OR gates 96 and 98. Signal R will cause the output of each of the OR gates 96 and 98 to generate binary 1 signals E and G respectively. It will be noted, so long as the reset signal R is applied to the input of OR gate 98 its output at G will be held at a binary 1 generating output signal $\overline{Q}$ representative of the reset state of the flip-flop.

The binary 1 signal G is connected back as one input to an AND gate 100, thus establishing one of the enable inputs to the gate. Let it be assumed at this time that the AND gate 100 is disabled. Thus, its output signal B is a binary 0. The binary 0 state of signal B is applied to the input of an OR gate 102, which is also receiving a binary 0 signal $\overline{E}$ from OR gate 96 via an inverter 104. As such, an output signal F from OR gate 102 is a binary 0. The binary 0 signal F is applied to an AND gate 105 disabling same. AND gate 105 being disabled generates a binary 0 output signal D which is applied to another OR gate 106. OR gate 106 also receives a binary 0 signal $\overline{G}$ via an inverter 108. Thus, an output signal H of OR gate 106 is a binary 0.

Signal H is applied as one input to an AND gate 110, thus disabling the gate, causing its output signal A to be a binary 0. It will be noted, however, that OR gate 96 also receives an input signal $\overline{F}$ via an inverter 112, which at this time is generating a binary 1. Thus, even when the input signal R is removed, the output signal E of OR gate 96 will remain at a binary 1 until the state of the flip-flop changes.

With the reset conditions established for the flip-flop of FIG. 6, its operation will now be explained with the assumption that the J and K inputs to AND gates 100 and 110 are both tied to the (V) potential, which is representative of a binary 1.

Assume now that the clock signal T goes positive to a binary 1. Since all three input signals to AND gate 100 are binary 1's, the gate will be enabled, generating a binary 1 signal B. Signal B is passed through OR gate 102, which generates a binary 1 signal F. Signal F is applied as one input to AND gate 105 and to inverter 112. Inverter 112 applies a binary 0 to OR gate 96, thus causing its output E to go to a binary 0. The binary 0 from OR gate 96 prevents AND gate 116 from being enabled and is also provided to inverter 104.

Inverter 104 now generates a binary 1 signal $\overline{E}$ which is applied to OR gate 102.

It can be seen from the description thus far that the outputs of OR gates 96 and 102 have changed to reflect the output states of OR gates 106 and 98 respectively. Thus, data is clocked into the flip-flop when the clock signal T goes positive.

With the conditions just established, assume now that the clock signal T goes negative to a binary 0.

Signal T is now inverted to a binary 1 signal $\overline{T}$ through an inverter 118. Signal $\overline{T}$ is applied to AND gates 105 and 116. However, only AND gate 105 will be enabled at this time since signal F is a binary 1 and E is a binary 0.

With AND gate 105 enabled, a binary 1 signal D is applied to OR gate 106, which generates a binary 1 signal H. Signal H is inverted through inverter 114 to a binary 0, thus causing the output of OR gate 98 to generate a binary 0.

The output G of OR gate 102 is inverted to a binary 1 signal $\overline{G}$ through inverter 108. The $\overline{G}$ signal causes the output of OR gate 106 to remain at a binary 1. The output state of the flip-flop has now changed from the reset state to a set state. This is portrayed by the output signals Q and $\overline{Q}$ which are now binary 1 and binary 0 respectively, which represents the set state of the flip-flop.

It can readily be seen that the flip-flop will change back to the reset state with the next positive and negative going clock signal. This can be ascertained by observing that AND gate 110 will be enabled when the clock goes positive. Its output A will thus go to a binary 1 to change the output states of OR gates 96 and 102 as previously described.

When the clock goes negative, AND gate 116 will be enabled to change the output states of OR gates 98 and 106 to a binary 1 and 0 respectively as described.

The following Boolean equations for the flip-flop of FIG. 6 are tabulated for reference purposes:

$$A = V\,H\,T$$
$$B = V\,G\,T$$
$$C = E\,\overline{T}$$
$$D = F\,\overline{T}$$
$$E = A + \overline{F} + R$$
$$F = B + \overline{E}$$
$$G = C + \overline{H} + R$$
$$H = D + \overline{G}$$

Figure 7:
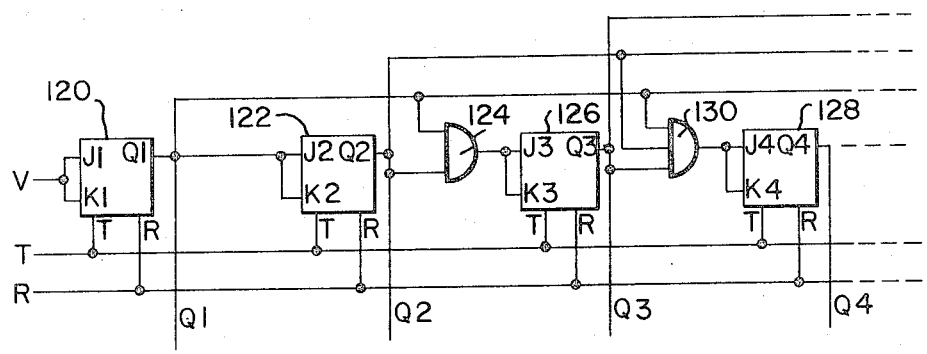
Figure 8:
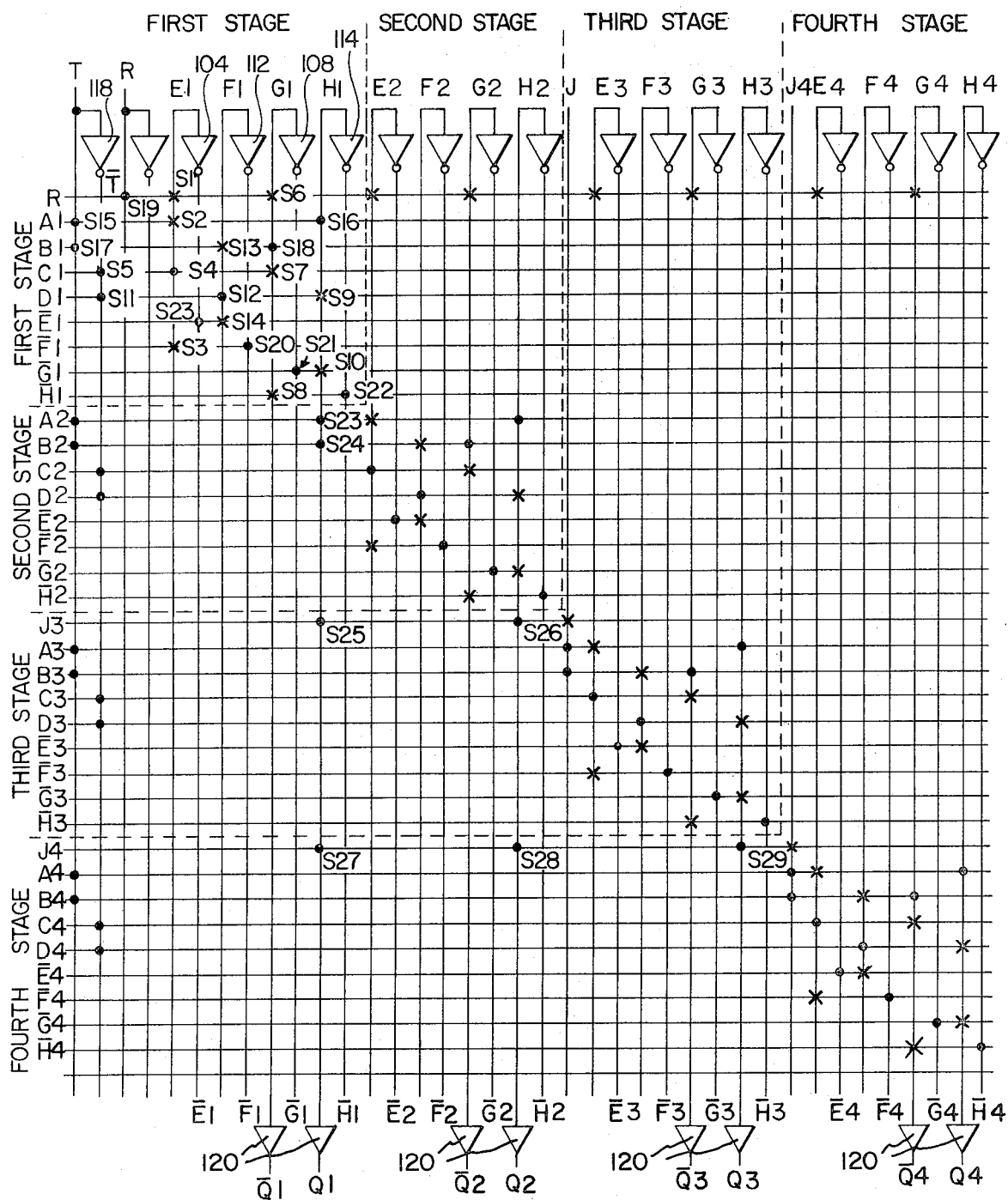
FIG. 8 is a logic schematic diagram of the type of counter of FIG. 7 utilizing the J-K flip-flops of the type of FIG. 6 constructed in accordance with the invention.

Reference is now made to FIG. 7 which discloses in standard block diagram form the implementation of four J-K flip-flops of the type of FIG. 6 to make up a synchronous parallel carry counter in accordance with the invention as shown in FIG. 8. FIG. 7 has also been included as an aid to the understanding of the description of FIG. 8 to follow. It will be noted in FIG. 7 that a first flip-flop stage 120 has inputs J1 and K1 tied in common to the binary 1 potential (V), allowing the flip-flop 120 to operate as a toggle. In a similar fashion, the output Q1 from flip-flop 120 is applied simultaneously to inputs J2 and K2 of a flip-flop counter stage 122. The output Q2 from flip-flop 122 is connected at one input to an AND gate 124, also receiving at another input the signal Q1 from flip-flop 120. The output of AND gate 124 is connected to inputs J3 and K3 of another binary stage 126, thus allowing 126 to also operate as a toggle in a fashion similar to flip-flops 120 and 122. A fourth flip-flop stage 128 also operates as a toggle by receiving at its J4 and K4 inputs an output from an AND gate 130. AND gate 130 receives input signals Q1, Q2 and Q3 from counter stages 120, 122, and 126 respectively.

From the previous description of FIG. 6, it will be recalled that when a J-K flip-flop is connected to operate as a toggle, the output state of the flip-flop will change each time the clock signal T goes in a negative direction. As such, the output signal Q1 of stage 120 will change state each time the clock signal makes a negative transition. Similarly, stage 122 will change state each time the clock signal makes a negative transition when the output signal Q1 of stage 120 is a binary 1.

Counter stage 126 will similarly change state when AND gate 124 is enabled by the application of signals Q1 and Q2. The three inputs to AND gate 130, Q3, Q2 and Q1 will enable the gate whenever stages 120, 122 and 126 are in the set states. Thus, when the clock signal T goes negative, stage 128 will change state. It can be seen from the logic structure of FIG. 7 that the circuit forms a standard synchronous parallel carry counter of well known type.

As shown by the dashed lines in the drawing going off the top of Q1, Q2, Q3 and Q4, it is possible to extend the counter to as many stages as desired.

Reference is now made to FIG. 8 which illustrates a four stage synchronous parallel carry counter constructed in a logic array to perform the functions as described in connection with FIGS. 6 and 7. It will be noted in FIG. 8 that each of the counter states is segmented into groups of column and row conductors by dashed lines. Further, it will be noted that the column and row conductors contain logic term nomenclature (signal designations) corresponding to that previously described in connection with FIGS. 6 and 7 and that each of the logic terms contains a subscript identifying it with its associated stage. For example, the logic terms A1, B1, C1, D1, E1, F1, G1, H1, $\overline{E1}$, $\overline{F1}$, $\overline{G1}$, and $\overline{H1}$ correspond to logic terms or signals generated within the first stage. The same analogy applies to the second, third and fourth stages. Further, the logic terms appearing adjacent to each of the row conductors are generated on a corresponding one of the row conductors when a logic term or terms are applied on a column conductor or conductors connected to a logic element or elements intersecting at corresponding ones of the columns and rows. Likewise, with the exception of input signals T and R, the logic terms appearing adjacent the column conductors are generated in response to the logic terms on the row conductors.

Each of the stages of FIG. 8 is comprised of a plurality of logic elements interconnected at intersecting column and row conductors to form AND gates, OR gates and signal feedback paths via the column and row conductors for controlling the operation of the stages.

As an aid to the understanding of FIG. 8, where applicable, a correspondence will be noted between those combinations of dots and X's comprising equivalent AND gates and OR gates and the inverters corresponding to the like elements previously described in connection with FIGS. 6 and 7.

In the ensuing description since each of the counter stages of FIG. 8 are substantially the same, only the first stage shown in the left-hand top portion will be described.

Referencing FIG. 8, a plurality of logic elements S1, S2 and S3 comprise an OR gate corresponding to OR gate 96 of FIG. 6. Two logic elements S4 and S5 comprise an AND corresponding to gate 116. Similarly, the OR gate 98 is represented by a group of logic elements S6, S7 and S8, for providing a term G1 to logic inverter 108. Logic elements S9 and S10, corresponding to OR gate 106 of FIG. 6, generate an output term H1, which is applied to the logic inverter 114. The AND gate 105 is represented by logic elements S11 and S12 for generating the term D1, which is applied to element S9. Another OR gate, corresponding to gate 102, is comprised of logic elements S13 and S14 and generates the term F1 which is applied to inverter 112. Two pairs of logic elements S15, S16 and S17, S18 comprise AND gates corresponding to gates 110 and 100 for generating terms A1 and B1 respectively.

In addition to the AND and OR gates just described, a plurality of gating logic elements are included in each of the stages of FIG. 8 for gating selected ones of the logic terms to the inputs of selected ones of the gates. One of these gating elements S19 receives the reset term R and passes it to the input of logic elements S1 and S6 as well as to corresponding elements in the successive stages. The term $\overline{F1}$ from inverter 112 is provided as an input to element S3 by a gating element S20. In a similar fashion to element S20, gating elements S21 and S22 provide the terms $\overline{G1}$ and $\overline{H1}$ to the inputs of elements S10 and S8 respectively.

The operation of the first stage of the circuit of FIG. 8 will now be explained by first applying the reset term R to the stage to establish a reset or first state. Then the operation of the circuit will be described making a transition from the first state to a set or second state.

Assume that the reset term R is applied as a binary 1 to the input of logic element S19. As indicated on the row conductor associated with S19, the term R is provided to elements S1 and S6 of equivalent OR gates 96 and 98 generating binary 1 terms E1 and G1 respectively. Term E1 is applied to inverter 104 and to element S4 of equivalent AND gate 116. Term G1 is inverted to a binary 0 through inverter 108 and applied to element S10 of equivalent OR gate 106 via element S21. The binary 1 term G1 is also fed back to S18 from S6 as one input of equivalent AND gate 100.

Referring back to the output term F1 from S13, F1 is inverted to a binary 1 through inverter 112 to generate term $\overline{F1}$ which is passed to the input of element S3 of equivalent OR gate 96 via element S20. Thus, the output E1 from the latter gate 96 remains at a binary 1 after term R is removed or until the state of the first stage is changed. Term E1 is also inverted through inverter 104 to generate the binary 0 state of $\overline{E1}$ which is applied through element S23 to the input of S14 of OR gate 102, thus keeping the output F1 of equivalent OR gate 102 at a binary 0 after the removal of the term R or until the state of the first stage is changed.

Reference is now made to S10 of corresponding OR gate 106. It will be recalled that the binary 1 term G is inverted through inverter 108 generating the binary 0 state of $\overline{G}$. Term $\overline{G1}$ is applied to S10 via element S21, thus the output H1 of equivalent OR gate 106 is a binary 0. Term H1 is inverted to a binary 1 term $\overline{H1}$ by inverter 114 and applied to S8 via S22, thus keeping the output G1 of equivalent OR gate 98 at a binary 1 generating the binary 1 output signal $\overline{Q}$, which is representative of the reset state of the first stage.

A plurality of amplifiers 120 may be included in the circuit of FIG. 8 for amplifying the output signals Q1, $\overline{Q1}$, through Q4, $\overline{Q4}$.

Having described the reset operation of the first binary stage, its operation will now be explained with the application of the clock signal T changing the state of the primary from the reset state to set state.

With the foregoing in mind, assume that the clock signal T goes positive to a binary 1. Signal T is applied simultaneously to elements S15 and S17 of equivalent AND gates 110 and 100. Equivalent AND gate 110 is disabled at this time because of the binary 0 state of term H1 at the input of element S16. However, equivalent AND gate 100 will be enabled due to the binary state of term G1 at the input of S18 generating binary 1 term B1. B1 is applied to element S13 of equivalent OR gate 102 thus generating binary 1 term F1, which is applied to inverter 112 and to element S12 of equivalent AND gate 105.

Reference is now made to the output of inverter 112 which is applying the binary 0 state of $\overline{F1}$ to the input of element S3 of equivalent OR gate 96 via gating element S20. Since all of the inputs to equivalent OR gate 96 at elements S1, S2 and S3 are binary 0's, the output E1 is a binary 0. Term E1 is inverted to a binary 1 signal $\overline{E1}$ through inverter 104 and applied, via element S23, to element S14 of equivalent OR gate 102. Thus, through the feedback paths constituting the term signals E1 and F1, the input state of the first stage has changed from the reset state to the set state.

With the conditions just established, assume now that the clock signal T goes in a negative direction to a binary 0. When this occurs, the input state of the flip-flop input logic structure or portion comprised of equivalent AND gates 100 and 110, OR gates 96 and 102, and inverters 104 and 112 will be transferred to change the output state of the flip-flop structure or portion of the first stage. The flip-flop output structure is comprised of equivalent AND gates 105 and 116, OR gates 98 and 106 and inverters 108 and 114. This changing of the output state of the first stage is accomplished as follows: When clock signal T goes to a binary 0, it is inverted to a binary 1 signal $\overline{T}$ through inverter 118. Signal $\overline{T}$ is applied to elements S5 and S11 of equivalent AND gates 116 and 105. Equivalent AND gate 116 is disabled at this time because of the binary 0 state of E1 applied to S4. However, equivalent AND gate 105 is enabled due to the binary 1 signal F1 at the input of S13. Thus, the output term D1 of equivalent AND gate 105 is applied to element S9 of equivalent OR gate 106 as a binary 1. Equivalent OR gate 106 in turn generates a binary 1 term H1 developing the binary 1 output signal Q of the first stage.

Term H1 is inverted through inverter 114, which applies the binary 0 state of term $\overline{H1}$ to element S8 via element S22, thus causing term G1 to go to a binary 0 at the output of equivalent OR gate 98. The output of equivalent OR gate 98 thus generates a binary 0 signal at the $\overline{Q}$ output. The states of the binary state signals Q and $\overline{Q}$ are now representative of the set state of the first stage.

Also, term H1 is applied to element S16 of equivalent AND gate 110 to enable one input thereof in preparation of the receipt of the next succeeding positive going clock signal T.

It is readily apparent from the previous discussion that the binary stage will change from the set state back to the reset state upon the application of the next succeeding positive going clock signal T. This may be ascertained by following the terms through the array structure in the manner previously described by assuming that the input term H1 to S16 of equivalent AND gate 110 is a binary 1.

In the embodiment of FIG. 8, it will also be noted that the reset term R is applied to logic elements in each of the second, third and fourth stages corresponding to elements S1 and S6 of the first stage. These elements are shown on the row conductor corresponding to term R and the column conductors corresponding to terms E2, G2, E3, G3 and E4, G4. Similarly, the clock signals T and $\overline{T}$ are applied to logic elements in each of the succeeding stages corresponding to the pairs of elements S15, S17 and S5, S11 respectively in the first stage. These latter elements are shown on the column conductors of terms T and $\overline{T}$ intersecting with the row conductors corresponding to the terms (A2, B2, C2, D2), (A3, B3, C3, D3), and (A4, B4, C4, D4).

The counter stages of FIG. 8 are connected together as follows:

Referencing FIGS. 6, 7 and 8, term Q1 (H1) from the first stage 120 is connected from the output of equivalent OR gate 106 to the J2, K2 inputs of the second stage 122 at logic elements S23 and S24. The signals to the J3, K3 inputs of the third stage 126 are applied through two logic elements S25 and S26 corresponding to AND gate 124 of FIG. 7. Term Q1 (H1) from equivalent OR gate 106 (S9 and S10) is applied to element S25, and term Q2 (H2) from the second stage (equivalent OR gate 106) is applied to S26. The signals to the J4, K4 inputs of the fourth stage 128 are applied through three logic elements S27, S28 and S29 corresponding to AND gate 130 of FIG. 7. Term Q1 (H1) from equivalent OR gate 106 is applied to element S27, term Q2 (H2) from the second stage is applied to element S28, and term Q3 (H3) from the third stage is applied to element S29.

From the previous description of the various embodiments of the invention, it is now apparent how they may be combined into several different types of logic circuit arrays wherein each array can perform combinational or sequential logic functions or both. Further, it is possible to implement logic in factored form merely by the select utilization of logic elements in the array. Binary counters, shift registers, toggle flip-flops, and storage buffers can all readily be constructed from the circuit array of the invention by interconnecting the logic elements to form signal feedback paths on the column and row conductors.

While the principles of the invention have now been made clear in a preferred embodiment, there will be immediately obvious to those skilled in the art many modifications of structure, arrangement, proportions, the elements, materials, and components used in the practice of the invention and otherwise which are particularly adapted for specific environments and operating requirements without departing from those principles. The appended claims are, therefore, intended to cover and embrace any such modifications within the limits only of the true scope of the invention.

What is claimed as new and desired to be secured by Letters Patent of the United States is:

1. A logic circuit comprising:

a plurality of column and row conductors insulated from one another and arranged substantially in orthogonally disposed columns and rows, said plurality of column conductors substantially perpendicularly intersecting said plurality of row conductors and forming intersections for connection purposes;

at least one binary storage element capable of achieving first and second states, said binary storage element comprising:
a plurality of logic elements, each having an input terminal and an output terminal, said plurality of logic elements individually associated with a corresponding one of the intersections, a first one and a second one of said plurality of logic elements being connected to a first one of said plurality of row conductors, the output terminal of said second one of said logic elements connected to the input terminal of said first one of said logic elements through said first one of said plurality of row conductors,
a third one and a fourth one of said plurality of logic elements being connected to a second one of said plurality of row conductors, the output terminal of said fourth one of said logic elements connected to the input terminal of said third one of said logic elements through said second one of said plurality of row conductors, a first column conductor connected to the output terminal of said first one of said logic elements, a second column conductor connected to the input terminal of said fourth one of said logic elements, means connecting said first and second column conductors together; and
a third column conductor connected to the output terminal of said third one of said logic elements, a fourth column conductor connected to the input terminal of said second one of said plurality of logic elements, means connecting said third and fourth column conductors together,
said first and second ones of said plurality of row conductors and said first, second, third and fourth ones of said column conductors defining signal feedback paths for controlling said binary storage element whereby said binary storage element will remain in either of said first and second states upon achieving either of said states.

2. A logic circuit as set forth in claim 1 further comprising:
fifth and sixth logic elements of said plurality of logic elements, the inut terminal of said fifth logic element being connected to a third row conductor of said plurality of row conductors, the output terminal of said fifth logic element being connected to said first one of said column conductors, and the input terminal of said sixth logic element being connected to a fourth row conductor of said plurality of row conductors, the output terminal of said sixth logic element being connected to said third one of said column conductors, said fifth and sixth logic elements receiving binary input signals at the respective input terminals thereof for controlling the first and second states of said binary storage element.

3. A logic circuit as set forth in claim 1 wherein:
said means connecting together said first and second column conductors of said plurality of column conductors comprise a first logic inverter, and said means connecting together said third and fourth column conductors of said plurality of column conductors comprise a second logic inverter.

4. A logic circuit comprising:
a plurality of column and row conductors insulated from one another and arranged in substantially orthogonally disposed columns and rows, said plurality of column conductors substantially perpendicularly intersecting said plurality of row conductors and forming intersections for connection purposes, said plurality of column and row conductors being arranged in groups, each group defining a one of a plurality of binary storage elements, each of said binary storage elements comprising;
an input storage portion and an output storage portion, each of said portions capable of achieving first and second binary states and each of said portions including,
a plurality of logic elements, each having an input terminal and an output terminal, each of said logic elements being associated with a corresponding one of the intersections, the input terminal of first predetermined ones of said plurality of logic elements each connected to a corresponding one of said column conductors at their associated intersections, the output terminal of said first predetermined ones of said logic elements each connected to a corresponding one of said row conductors at their associated intersections, and the input terminal of second predetermined ones of said logic elements each connected to a corresponding one of said row conductors at their associated intersections for receiving signals from said first predetermined ones, the output terminal of said second predetermined ones of said logic elements each connected to a corresponding one of said column conductors at their associated intersections for providing signals from each storage portion to the other storage portion to the input terminal of each of said first predetermined ones in each of said storage portions, said column and row conductors interconnecting said first and second predetermined ones of said plurality of logic elements to form signal feedback paths between the output and input terminals of said first and second predetermined ones of said logic elements for controlling the first and second states of each of said portions, certain ones of said first predetermined ones of said plurality of logic elements in said input and output storage portions each receiving at the input terminal thereof on a corresponding one of said plurality of column conductors a clock signal, said input storage portion achieving a one of said first and second states in accordance with the states of the signals applied to said first predetermined ones thereof from said second predetermined ones of said second portion when the clock signal achieves a first value, and said output storage portion achieving a one of said first and second states in accordance with the states of the signals applied to said first predetermined ones thereof from said second predetermined ones of said first storage portion when the clock signal achieves a second value.

5. A logic circuit as set forth in claim 4 wherein each of said binary storage elements is a J-K flip-flop, and wherein binary variable input signals are provided to the input terminal of other ones of said first predetermined ones of said plurality of logic elements in said input storage portion for controlling the states of each of said binary storage elements in accordance with the states of the signals provided to said first predetermined ones of said logic elements of said input storage portion from said second predetermined ones of said logic elements of said output storage portion and in accordance with the states of the binary variable input signals applied to said other ones of said first predetermined ones of said input storage portions, and further in accordance with the states of the signals provided to said first predetermined ones of said logic elements of said output storage portion from said second predetermined ones of said logic elements of said input storage portion when the clock signal applied to said first predetermined ones of said logic elements of each of said input and output storage portions achieves the first and second values respectively.

6. A logic circuit as set forth in claim 5 wherein the signals provided by said second predetermined ones of said output storage portion of each of said plurality of binary storage elements is connected to the input terminal of said other ones of said first predetermined ones of said logic elements of said input storage portion of at least one other succeeding binary storage element to form a plurality of cascaded binary storage elements.

7. A logic circuit as set forth in claim 6 wherein said plurality of cascaded binary storage elements forms a binary counter.

8. A logic circuit as set forth in claim 4 further comprising a logic inverter connected in series with each of said column conductors interconnecting said first and second predetermined ones of said plurality of logic elements of the signal feedback paths in each of said input and output storage portions for controlling the states of said input and output storage portions of each of said plurality of binary storage elements.

9. A logic circuit comprising:
an array of logic elements each having an input terminal and an output terminal, said logic elements being arranged in orthogonally disposed columns and rows;
a plurality of input connecting means each associated with one of the columns of logic elements and providing input variables in binary signal form to the input terminals of first predetermined logic elements in that column, the binary input signals being individual to each such column;
a plurality of row conductor means each associated with one of the rows of logic elements and connected to the output terminals of said first predetermined logic elements in that row, at least one of said row conductor means further being connected to the output terminals of second predetermined logic elements in its respective row, and at least one of said row conductor means further being connected to the input terminals of third predetermined logic elements in its respective row, the logic elements whose outputs are thus connected by each of said row conductor means providing Boolean functions of signals appearing at the input terminals of said first and second predetermined logic elements in that row, which functions serve as input signals to said third predetermined logic elements in the same row and may also serve as array output signals; and one or more column conductor means each associated with one of the columns of logic elements and connected to the output terminals of said third predetermined logic elements in that column, at least one of said column conductor means further being connected to the input terminals of said second predetermined logic elements in its respective column, the logic elements whose outputs are thus connected by each of said column conductor means providing Boolean functions of signals appearing at the input terminals of said third predetermined logic elements in that column, which functions serve as input signals to said second predetermined logic elements in the same column and may also serve as array output signals;
whereby the logic elements of said array as connected through said row and column conductor means may generate complex multiple output Boolean functions of individual array input variables and lower level functions of these variables generated within the array.

10. A logic circuit as set forth in claim 9 wherein:
said first predetermined logic elements in at least one of said rows comprise a first logic gate for generating first signals on said row conductor in that row, said first signals being representative of combinations of the binary input signals applied to the input terminals of said first predetermined logic elements; and
wherein said third predetermined logic elements in at least one of said columns comprise a second logic gate for generating second signals on said column conductor means in that column, said second signals being representative of combinations of the first signals applied to the input terminals of said third predetermined logic elements.

11. A logic circuit as set forth in claim 9 wherein:
each of said logic elements is a semiconductor, each of said semiconductors having gate, source and drain electrodes, the gate electrode of each of the semiconductors of said first predetermined logic elements receiving the binary input signals individual to their respective columns, said plurality of row conductor means connecting together the drain electrodes of the semiconductors of said first and second predetermined logic elements in their respective rows, said plurality of row conductor means further being connected to the gate electrode of each of the semiconductors of said third predetermined logic elements in their respective rows; and
said column conductor means connecting together the source electrodes of the semiconductors of said third predetermined logic elements in their respective columns, each of said column conductor means further being connected to the gate electrode of each of the semiconductors of said second predetermined logic elements in that column.

12. A logic circuit as set forth in claim 11 wherein:

the drain electrode of each of the semiconductors of said third predetermined logic elements is adapted to be connected in common to a first potential source;

the source electrode of each of the semiconductors of said first and second predetermined logic elements is adapted to be connected in common to a second potential source, said logic circuit further comprising;

a plurality of first load elements individually connected at one end thereof to said row conductor means and thereby to the drain electrodes of semiconductors in their respective rows and connected in common at the opposite ends thereof and adapted to be connected to the first potential source; and a plurality of second load elements individually connected at one end thereof to said column conductor means and thereby to the source electrodes of semiconductors in their respective columns and connected in common at the opposite ends thereof and adapted to be connected to the second potential source.

13. A logic circuit as set forth in claim 9 further comprising a plurality of logic inverters individually connected to a corresponding one of said plurality of input connecting means for providing signals representative of the complement of the binary input signals on each of said input connecting means to certain of said first predetermined logic elements.

14. A logic circuit as set forth in claim 9 further comprising:

a plurality of logic inverters individually connected to a corresponding one of said column conductor means for providing signals representative of the complement of internally generated signals on said column conductor means to at least one of said second predetermined logic elements.

15. A logic circuit as set forth in claim 9 wherein each of said plurality of logic elements is a diode, each of said diodes having a cathode and an anode, the cathodes of the diodes in each of the columns of said first predetermined logic elements receiving the input signals to that column, said plurality of row conductor means connecting together the anodes of the diodes of said first, second and third predetermined logic elements in their respective rows, and said column conductor means connecting together the cathode of each of said third predetermined logic elements in their respective columns.

16. A logic circuit as set forth in claim 15, further comprising:

a plurality of first load elements individually connected at one end thereof to the anodes of diodes of corresponding ones of said row conductor means and connected in common at the opposite ends thereof and adapted to be connected to a first potential source; and a plurality of second load elements, certain ones being individually connected at one end to said input connecting means and certain others being individually connected at one end to said column conductor means, said second load elements further being connected in common at their opposite ends to a second potential source.

17. A logic circuit as set forth in claim 9 wherein said first and second predetermined logic elements associated with at least two of said row conductor means generate AND function signals thereon in response to the binary input signals applied to the input terminals of those logic elements, and wherein said third predetermined logic elements associated with at least one of said column conductor means generate OR function signals thereon in response to the AND function signals applied to the input terminals of those logic elements.

18. A logic circuit as set forth in claim 9 wherein said first and second predetermined logic elements associated with corresponding ones of said row conductor means generate OR function signals thereon in response to the binary input signals applied to the input terminals of said first and second predetermined logic elements, and wherein said third predetermined logic elements associated with corresponding ones of said column conductor means generate AND function signals in response to the OR function signals applied to the input terminals of said third predetermined logic elements.

19. A logic circuit as set forth in claim 9 wherein said first and second predetermined logic elements associated with corresponding ones of said row conductor means generate NAND function signals thereon in response to the binary input signals applied to the input terminals of said first and second predetermined logic elements, and wherein said third predetermined logic elements associated with corresponding ones of said column conductor means generate NAND function signals in response to the NAND function signals applied to the input terminals of said third predetermined logic elements.

20. A logic circuit as set forth in claim 9 wherein said first and second predetermined logic elements associated with corresponding ones of said row conductor means generate NOR function signals thereon in response to the binary input signals applied to the input terminals of said first and second predetermined logic elements, and wherein said third predetermined logic elements associated with corresponding ones of said column conductor means generate NOR function signals in response to the NOR function signals applied to the input terminals of said third predetermined logic elements.

21. A logic circuit as set forth in claim 9 wherein said first and second predetermined logic elements associated with corresponding ones of said row conductor means generate Exclusive OR function signals thereon in response to the binary input signals applied to the input terminals of said first and second predetermined logic elements, and wherein said third predetermined logic elements associated with corresponding ones of said column conductor means generate Exclusive OR function signals thereon in response to the Exclusive OR function signals applied to the input terminals of said third predetermined logic elements.

* * * * *